(12) United States Patent
Popovici et al.

(10) Patent No.: US 6,778,909 B1
(45) Date of Patent: Aug. 17, 2004

(54) SEISMIC DATA PROCESSING SYSTEMS AND METHODS

(75) Inventors: Alexander M. Popovici, Portola Valley, CA (US); Sean E. Crawley, Katy, TX (US); Dimitri Bevc, Pleasanton, CA (US); Biondo Biondi, Stanford, CA (US)

(73) Assignee: 3DGeo Development, Inc., Santa Clara, CA (US)

( * ) Notice: Subject to any disclaimer, the term of this patent is extended or adjusted under 35 U.S.C. 154(b) by 69 days.

(21) Appl. No.: 10/348,545

(22) Filed: Jan. 21, 2003

Related U.S. Application Data

(60) Provisional application No. 60/416,093, filed on Oct. 5, 2002.

(51) Int. Cl.[7] .............................................. G01V 1/28
(52) U.S. Cl. ...................................................... 702/17
(58) Field of Search ............................. 702/14, 16, 17, 702/18; 367/73

(56) References Cited

U.S. PATENT DOCUMENTS

| | | | |
|---|---|---|---|
| 5,657,223 A | 8/1997 | Juszczak et al. | 705/400 |
| 5,987,387 A | 11/1999 | Dickens et al. | 702/14 |
| 5,991,695 A | 11/1999 | Wang et al. | 702/14 |
| 6,021,379 A | 2/2000 | Duren et al. | 702/16 |
| 6,418,379 B1 | 7/2002 | Bloor et al. | 702/17 |

OTHER PUBLICATIONS

Biondi, B., 1997, Azimuth moveout+ common–azimuth migration: Cost–effective prestack depth imaging of marine data, 67th Ann. Internat. Mtg. Soc. of Expl. Geophys., 1375–1378.

Biondi, B., 2001, Narrow–Azimuth Migration: Analysis and tests in vertically layered media, Stanford Exploration Project, Report 108, Apr. 29, 2001, 1–14.

Biondi, B. L. and Palacharla, G., 1995, 3–D prestack depth migration of common–azimuth data, 65th Ann. Internat. Mtg. Soc. of Expl. Geophys., 1197–1200.

Biondi, B. and Palacharla, G., 1994, 3–D prestack migration of common–azimuth data, 64th Ann. Internat. Mtg, Soc. of Expl. Geophys., 1175–1178.

Biondi, B. and Palacharla, G., 1996, 3–D prestack migration of common–azimuth data: Geophysics Soc. of Expl. Geophys., 61, 1822–1832.

Biondi, B. and Vaillant, L., 2000, 3–D wave–equation prestack imaging mode salt, 70th Ann. Internat. Mtg: Soc. of Expl. Geophys. 906–909.

(List continued on next page.)

*Primary Examiner*—Donald McElheny, Jr.
(74) *Attorney, Agent, or Firm*—Andrei D. Popovici

(57) ABSTRACT

In one embodiment, a computer-implemented common azimuth migration seismic data processing method comprises: providing a common-azimuth input data set for a geophysical data processing volume of interest; providing a velocity model for the volume; applying an offset antialiasing operator to the input data set; and performing a recursive downward-continuation of the common-azimuth input data set to a plurality of successive common-azimuth surfaces to generate an image of the volume of interest. In one embodiment, the present invention further provides for selecting a depth dependence of an offset range employed in the downward continuation; selecting a frequency-dependence of a depth step size employed in the downward continuation; selecting a frequency dependence of a cutoff depth employed in the downward continuation; and adding reciprocal traces to the data around zero offset, for reducing imaging artifacts introduced by data edge effects. Similar methods can be applied with a narrow-azimuth downward continuation operator.

32 Claims, 5 Drawing Sheets

OTHER PUBLICATIONS

Fliedner, M. M., Crawley, S., Bevc, D., Popovici, A. M. and Biondi, B., 2002, Velocity model building by wavefield-continuation imaging in the deepwater Gulf of Mexico: The Leading Edge 21, No. 12, 1232–1236.

Jin, S. and Mosher, C., 2001, Offset plane wave pseudo-screen migration, 71st Ann. Internat. Mtg: Soc. of Expl. Geophys., 1029–1032.

Jin, S., Mosher, C. and Wu, R. S., 2000, 3–D prestack wave equation common offset pseudoscreen depth migration, 70th Ann. Internat. Mtg: Soc. of Expl. Geophys., 842–845.

Jin, S., Mosher, C. and Wu, R.–S., 2002, Offset–domain pseudoscreen prestack depth migration: Geophysics, Soc. of Expl. Geophys., 67, 1895–1902.

Mosher, C. and Foster, D., 2000, Common angle imaging conditions for prestack depth migration, 70th Ann. Internat. Mtg: Soc. of Expl. Geophys., 830–833.

Popovici, A., 1992, 3–D phase shift plus interpolation and split–step migration and modeling on a massively parallel computer, 62nd Ann. Internat. Mtg: Soc. of Expl. Geophys., 320–322.

Popovici, A., 2000, 3–D wave–equation prestack depth migration, 70th Ann. Internat. Mtg: Soc. of Expl. Geophys., 493–496.

Popovici, A. M., 1995, Phase–shift migration to zero offset, 65th Ann. Internat. Mtg: Soc. of Expl. Geophys., 1212–1215.

Popovici, A. M., 1996, Prestack migration by split–step DSR: Geophysics, Soc. of Expl. Geophys., 61, 1412–1416.

Popovici, A. M., 1994, Reducing artifacts in prestack phase–shift migration of common–offset gathers, 64th Ann. Internat. Mtg: Soc. of Expl. Geophys., 684–687.

Sava, P., Biondi, B. and Fomel, S., 2001, Amplitude–preserved common image gathers by wave–equation migration. 71st Ann. Internat. Mtg: Soc. of Expl. Geophys., 296–299.

Vaillant, L. and Biondi, B., 1999, Extending Common–Azimuth Migration, Stanford Exploration Project, Report 100, Apr. 20, 1999, 125–135.

Vaillant, L., Calandra, H., Sava, P. and Biondi, B., 2000, 3–D wave–equation imaging of a North Sea dataset: Common–azimuth migration+ residual migration, 70th Ann. Internat. Mtg: Soc. of Expl. Geophys., 874–877.

Vaillant. L., Sava, P., Biondi, B. and Calandra, H., 2000, 3D prestack wave–equation migration of a common–asimuth North Sea dataset, 62nd Mtg.: Eur. Assn. Geosci. Eng., Session:L0043.

Xie, X.–B., Jin. S. and Wu, R.–S., 2001, 3D Prestack Depth Migration Using Generalized Screen Propagators, 63rd Mtg.: Eur. Assn. Geosci. Eng., Session: P061.

Xie. X. –B., Mosher, C. and Wu, R. S., 2000. The application of the wide angle screen propagator to 2–D and 3–D depth migrations, 70th Ann. Internat. Mtg: Soc. of Expl. Geophys., 878–881.

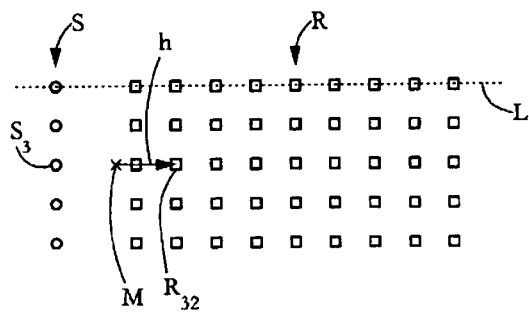
FIG. 2-A
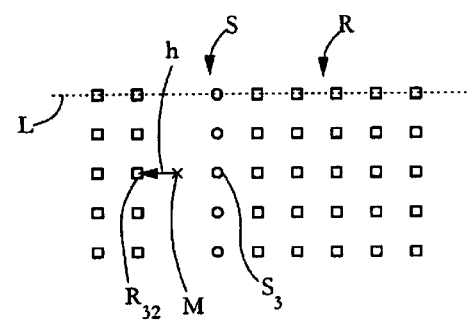
FIG. 2-B
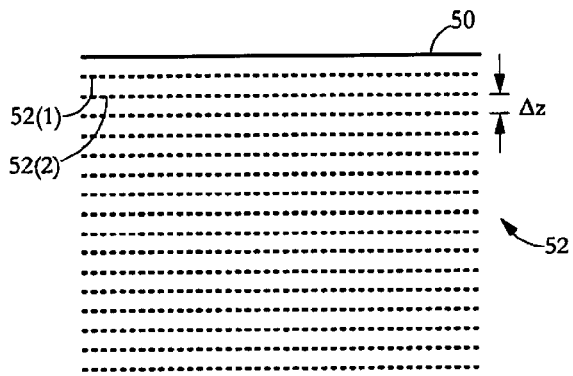
FIG. 2-C
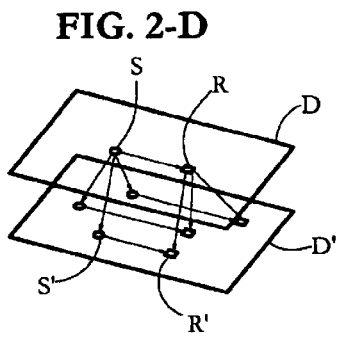
FIG. 2-D
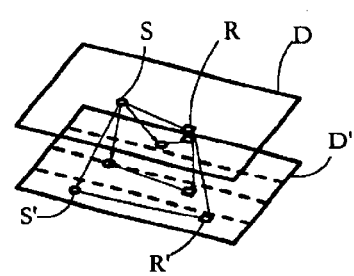
FIG. 2-E

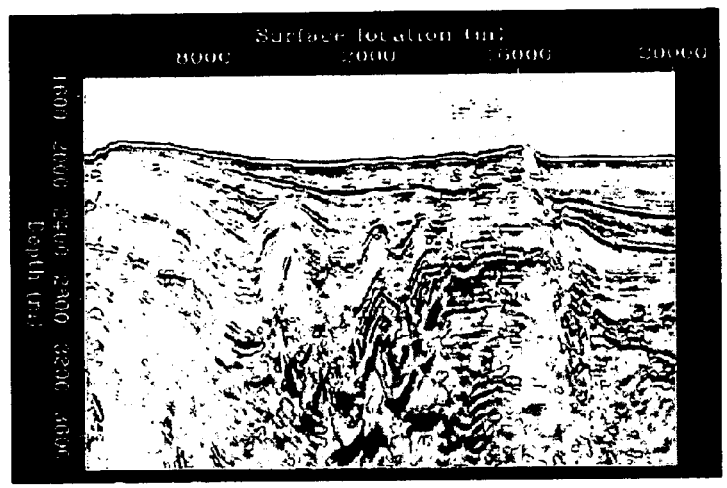
FIG. 3-A
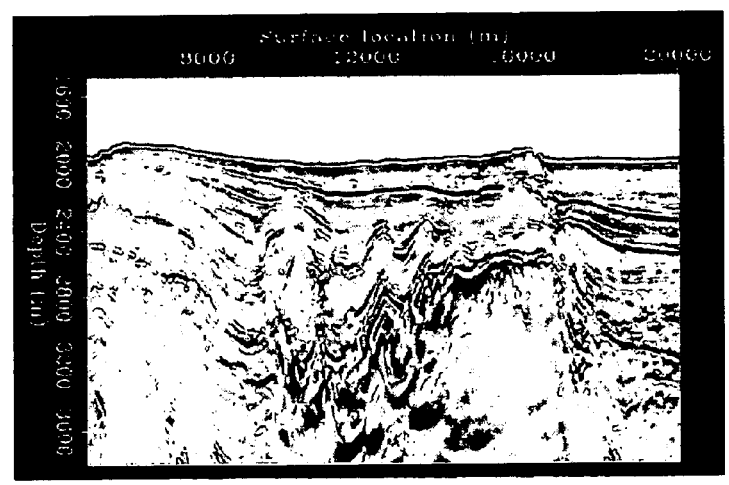
FIG. 3-B
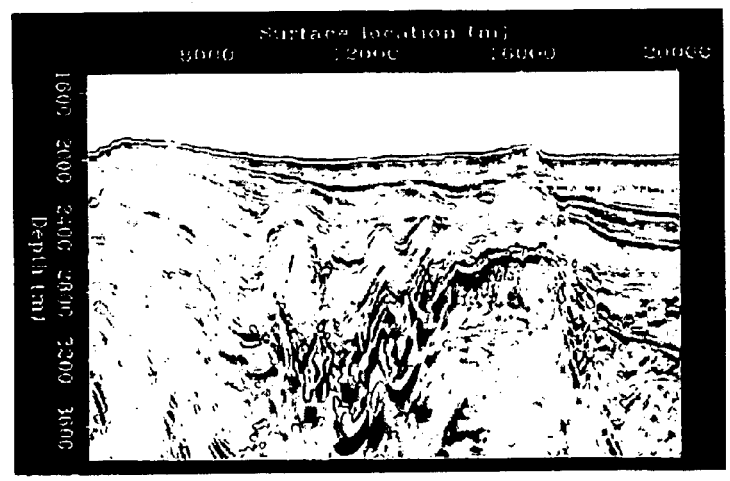
FIG. 3-C

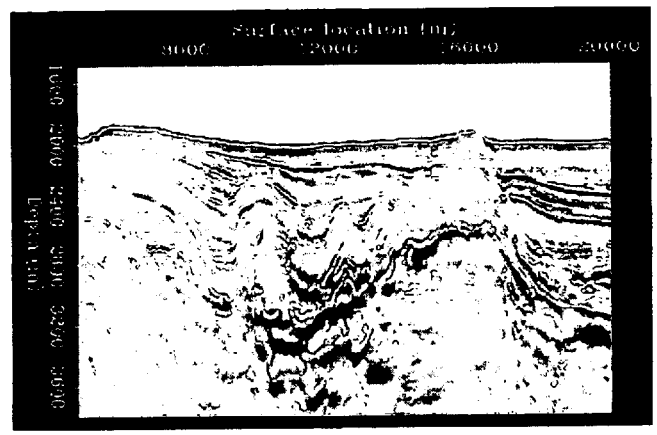
FIG. 3-D
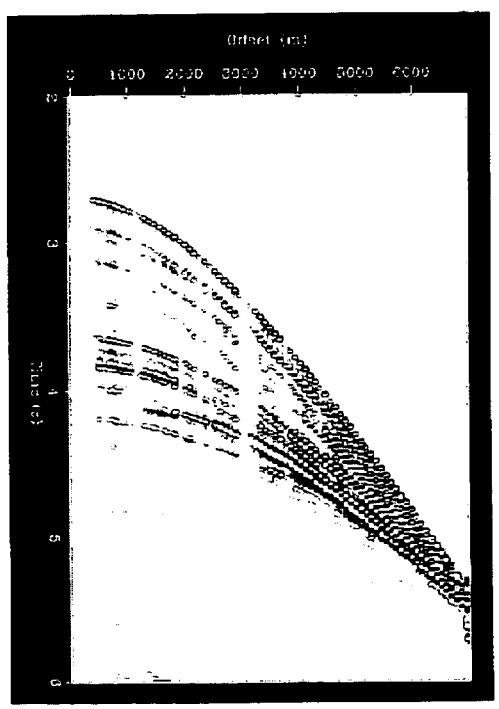
FIG. 4-A
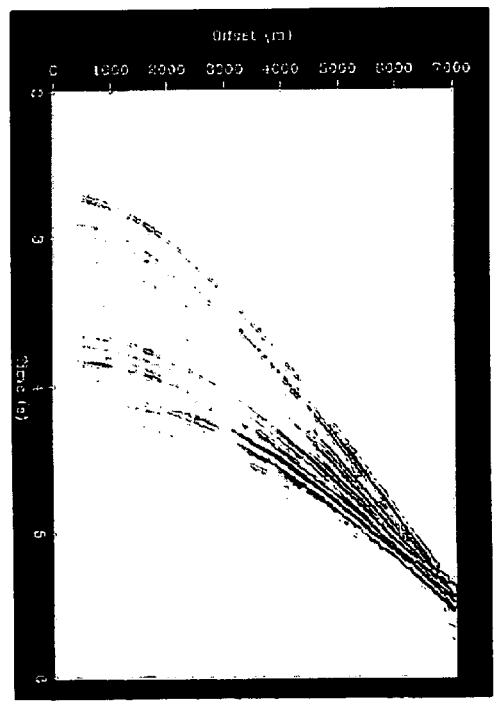
FIG. 4-B

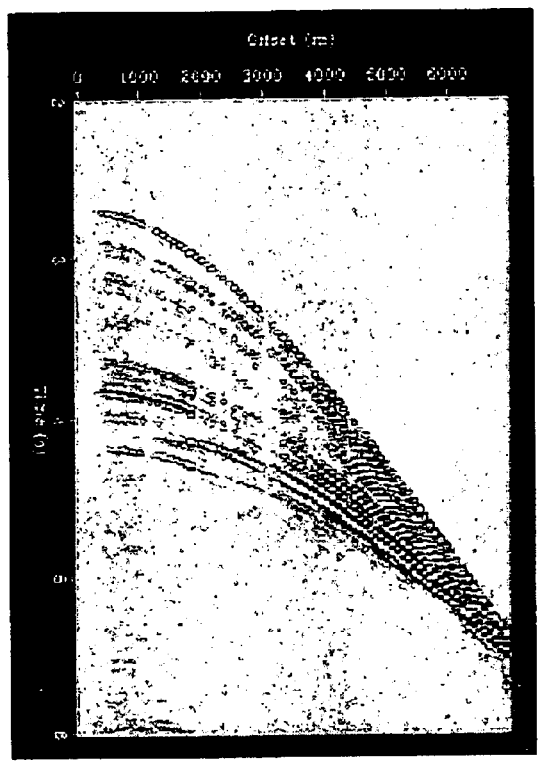 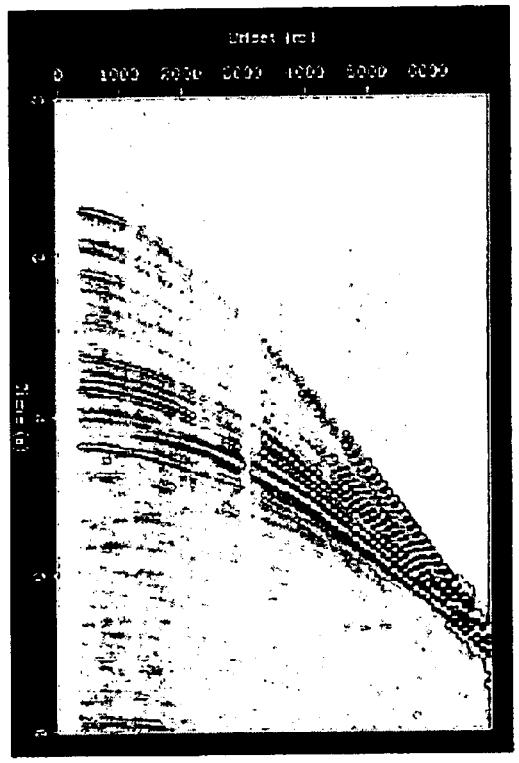
FIG. 5-A  FIG. 5-B
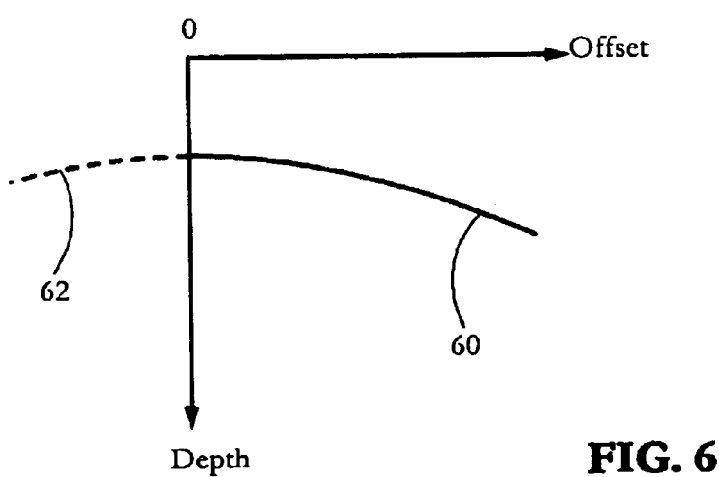
FIG. 6

SEISMIC DATA PROCESSING SYSTEMS AND METHODS

RELATED APPLICATION DATA

This application is based on U.S. Provisional Patent Application No. 60/416,093, filed Oct. 5, 2002, which is herein incorporated by reference.

FIELD OF THE INVENTION

This invention relates to geophysical prospecting using seismic signals, and in particular to systems and methods for performing seismic data processing.

BACKGROUND

Effectively searching for oil and gas reservoirs often requires imaging the reservoirs using three-dimensional (3-D) seismic data. Seismic data are recorded at the earth's surface or in wells, and an accurate model of the underlying geologic structure is constructed by processing the data. 3-D seismic imaging is perhaps the most computationally intensive task facing the oil and gas industry today. The size of typical 3-D seismic surveys can be in the range of hundreds of gigabytes to tens of terabytes of data. Processing such large amounts of data often poses serious computational challenges.

Obtaining high-quality earth images necessary for contemporary reservoir development and exploration is particularly difficult in areas with complex geologic structures. In such regions, conventional seismic technology may either incorrectly reconstruct the position of geological features or create no usable image at all. Moreover, as old oil fields are depleted, the search for hydrocarbons has moved to smaller reservoirs and increasingly hostile environments, where drilling is more expensive. Advanced imaging techniques capable of providing improved knowledge of the subsurface detail in areas with complex geologic structures are becoming increasingly important.

In a typical seismic survey, elastic (seismic) waves are propagated into the earth region of interest. The elastic waves may be generated by various types of sources such as dynamite, air guns, and hydraulic vibrators, situated along the earth's surface. As these waves propagate downward through the earth, portions of their energy are sent back to the earth's surface by reflection and refraction which occur whenever abrupt changes in impedance are encountered. The reflected and/or refracted seismic waves are recorded at the earth's surface or in wellbores by an array of receivers such as geophones, hydrophones, or other similar devices. The underlying earth structure can be imaged by appropriate processing of the signals returned to the receivers.

Raw seismic data as recorded are generally not readily interpretable. While such data show the existence of formation interfaces, raw data do not accurately inform the interpreter as to the location of these interfaces. The process of migration, also called imaging, repositions the seismic data so that a more accurate picture of subsurface reflectors is given. In order to perform migration calculations, the seismic velocities of the subsurface at a multitude of points are first determined, commonly by performing migration velocity analysis (MVA). A two- or three-dimensional spatial distribution of subsurface velocity forms a velocity model for the subsurface region of interest. A large-scale velocity model covering the extent of the seismic data acquisition volume can be a complicated structure with vertically and laterally varying velocity. The velocity model is used to compute a set of traveltimes for the volume of interest. A traveltime is the amount of time a seismic signal takes to travel from a source to a subsurface reflection point and back to a receiver. The migration process employs the computed traveltimes to generate an accurate image of the volume of interest.

Known migration approaches include Kirchhoff migration and wave-equation migration. Kirchhoff migration algorithms have been widely used for seismic imaging. While Kirchhoff integral equation methods are generally considered practical and efficient, such methods have several shortcomings. Wave-equation methods that downward continue the wavefield have been recently shown to produce good imaging results in many synthetic and real data cases. Wave-equation migration methods can yield improved images relative to Kirchhoff migration methods. At the same time, conventional wave-equation migration methods can suffer from suboptimal computational efficiency and undesired imaging artifacts.

SUMMARY

In the preferred embodiment, the present invention provides a computer-implemented common azimuth migration seismic data processing method comprising: providing a common-azimuth input data set for a geophysical data processing volume of interest; providing a velocity model for the geophysical data processing volume; applying an offset antialiasing operator to the input data set; and performing a recursive downward-continuation of the common-azimuth input data set to a plurality of successive common-azimuth surfaces to generate an image of the volume of interest. In the preferred embodiment, the present invention further provides for selecting a depth dependence of an offset range employed in the downward continuation; selecting a frequency-dependence of a depth step size employed in the downward continuation; selecting a frequency dependence of a cutoff depth employed in the downward continuation; and adding reciprocal traces to the data around zero offset, for reducing imaging artifacts introduced by data edge effects. Similar methods can be applied with a narrow-azimuth downward continuation operator.

DESCRIPTION OF THE FIGURES

FIGS. 2-A–D illustrate schematically several exemplary common azimuth seismic source/receiver arrangements, according to the present invention.

FIG. 2-E illustrates schematically an exemplary narrow-azimuth source/receiver arrangement, according to the present invention.

FIGS. 3-A–D show exemplary migrated images generated by several different processing methods, according to the present invention.

FIGS. 4-A–B show exemplary common depth point (CDP) gathers corresponding to parts of the images of FIGS. 3-A–D, illustrating the effects of offset sampling, according to the present invention.

FIGS. 5-A–B show exemplary CDP gathers corresponding to the CDP gather of FIG. 4-A, illustrating the effects of offset bandpass filtering, according to the present invention.

FIG. 6 illustrates an event line corresponding to events along a number of traces near zero offset, and a reciprocal event line corresponding to reciprocal traces, according to the present invention.

DETAILED DESCRIPTION

Figure 1:
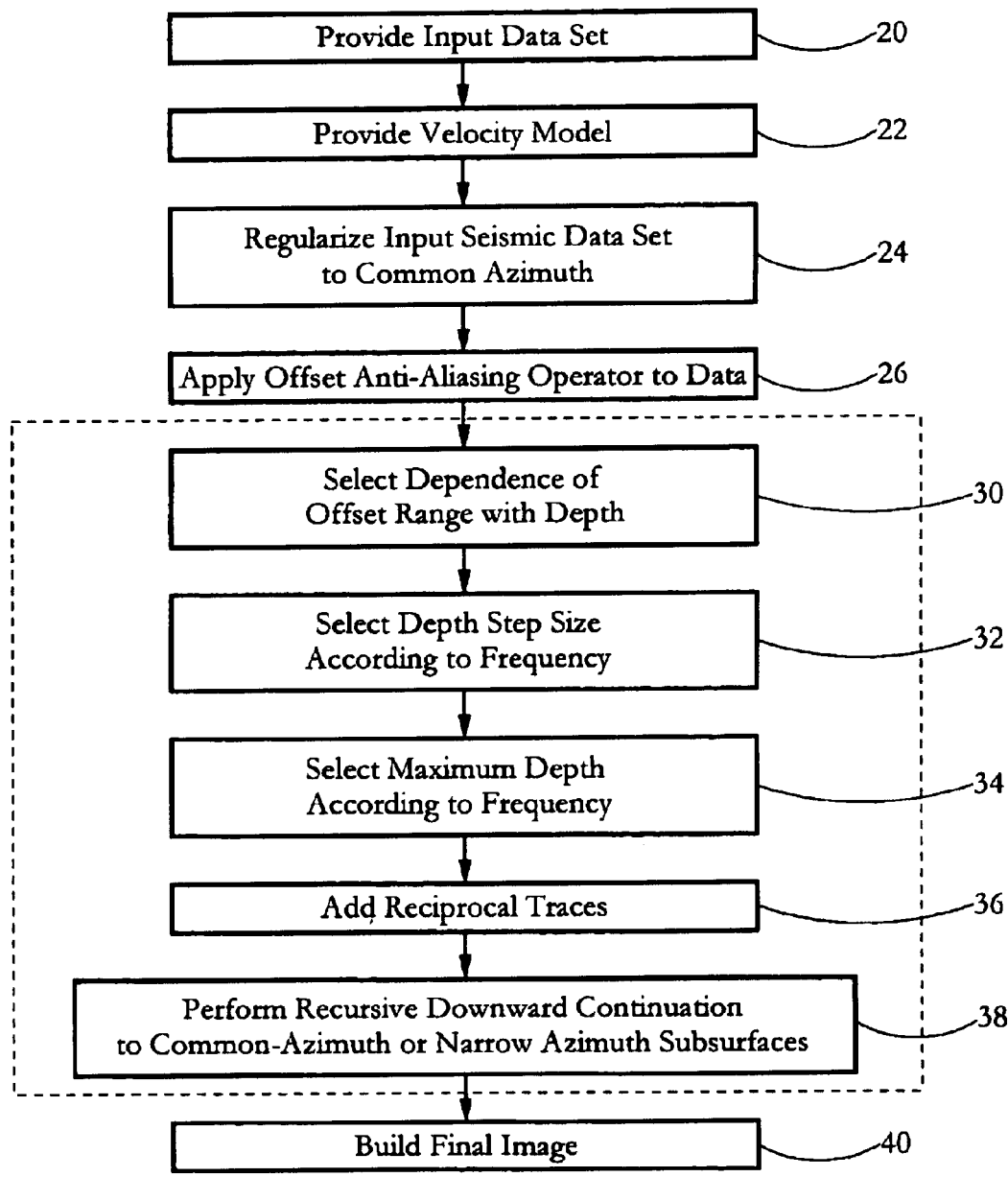
FIG. 1 is a flowchart showing the steps of a seismic common azimuth migration method according to the preferred embodiment of the present invention.

The following description illustrates the present invention by way of example and not necessarily by way of limitation. In the following description, unless specified otherwise, a location on a grid is understood to refer to a source/receiver pair. The term velocity will be understood to encompass both speeds and slownesses. As the skilled artisan will appreciate, it is understood that the equations disclosed herein are not changed by the mere use of other equivalent variables (e.g. velocity instead of slowness) to represent the same equation. Any reference to an element is understood to refer to at least one element. A set of elements is understood to include one or more elements.

FIG. 1 is a flowchart illustrating a common azimuth migration method according to the preferred embodiment of the present invention. In a first step 20, an input data set for a seismic exploration volume of interest is provided. The input data set comprises a set of seismic signals recorded on a recording medium. The seismic signals may be real data recorded on the earth's surface or within wells using geophones or hydrophones. The seismic signals may also be synthetic data corresponding to the earth's surface, to some underground surface or other locations. Synthetic data may be generated from real data, other synthetic data, velocity data, and/or petrophysical rock data. Methods suitable for generating synthetic data include modeling, migration, and datuming methods. Examples of such methods include Kirchhoff modeling, finite-difference modeling, phase-shift modeling, Kirchhoff migration, finite-difference migration, phase-shift migration, reverse time migration, generalized screen propagation (GSP), migration to zero offset (MZO), and controlled illumination migration, among others.

In a second step 22, a velocity model for the volume of interest is provided. The velocity model is a 3-D array describing the distribution of velocities on a grid within the volume of interest. For simplicity, the term velocity will be used to refer to both speeds and slownesses within the model. The grid is preferably a Cartesian (x-y-z) grid, although spherical, tetragonal, hexagonal or other grids may also be used. Determining a suitable velocity model for a given volume is known in the art. Preferably, the velocity model is determining by performing migration velocity analysis (MVA) by common azimuth migration using angle-domain common image gathers (ACIGs). For information on velocity analysis using ACIGs see U.S. patent application Ser. No. 09/877,133, filed Jun. 8, 2001, entitled "Velocity Analysis using Angle-Domain Common Image Gathers," which is herein incorporated by reference. Briefly, migration velocity analysis using ACIGs involves changing the velocity model so as to horizontally align a plurality of events on an angle-domain common image gather.

In a third step 24, if the input data set is not arranged in a common azimuth geometry, the geometry of the input data set is regularized to common azimuth. Re-arranging a data set having an arbitrary geometry to common azimuth can be performed by azimuth moveout (AMO), for example as described in U.S. patent application Ser. No. 10/235,877, filed Sep. 5, 2002, entitled "Output Based Azimuth Moveout Re-Gridding of Seismic Data," herein incorporated by reference.

FIGS. 2-A and 2-B illustrates schematically two exemplary arrangements of sources and receivers having a common azimuth along an initial surface. The azimuth direction refers to the orientation of the source-receiver vector corresponding to each input data set trace. Each trace in the common-azimuth data set corresponds to a pair defined by a source S and a receiver R, where the source S and receiver R are along the same line L. All the sources S and receivers R of the data set are arranged along a plurality of parallel lines L. Each input data set trace can be identified by its source and receiver coordinates, or by, the coordinates of the midpoint and offset corresponding to a (Source, Receiver) pair. Each FIG. 2-A, 2-B shows an exemplary midpoint M corresponding to a source $S_3$ and a receiver $R_{32}$, and a corresponding offset vector h extending between midpoint M and receiver $R_{32}$ (or source $S_3$). The orientation (angle) of offset vector h is the azimuth of the trace corresponding to source $S_3$ and receiver $R_{32}$. Generally, an input data set can be a five-dimensional array, where each amplitude along a trace is characterized by the two coordinates or the source, two coordinates of the receiver, and time. A data set arranged to common azimuth is a four-dimensional array, since all the traces have the same azimuth.

A number of steps 28–36 modify the execution of a common azimuth downward-continuation step 38, and can be thought of conceptually to form part of step 38. Steps 28–36 can be performed prior to the recursive execution of step 38. Steps 28–36 may also be performed repeatedly, as needed, concurrently with the recursive execution of the downward-continuation process from surface to surface. Steps 28–36 can be performed in various orders different from the exemplary ordering shown in FIG. 1.

In step 38, the common-azimuth initial data set is recursively downward continued to a plurality of common-azimuth or narrow-azimuth generally-horizontal, parallel subsurfaces. FIG. 2-C shows schematically an initial surface 50 (e.g. the Earth surface), and a plurality of parallel subsurfaces 52. The common-azimuth data corresponding to initial surface 50 is downward continued to a first subsurface 52(1) situated a depth step $\Delta z$ below initial surface 50. The depth step $\Delta z$ can be frequency-dependent, as described below. The downward continuation process generates a common-azimuth or narrow-azimuth data set corresponding to the first subsurface 52(1). The data set corresponding to first subsurface 52(1) represents substantially the data that would have been recorded at the source and receiver locations along subsurface 52(1), had actual sources and receivers been placed along subsurface 52(1) rather than along initial surface 50. The data corresponding to first subsurface 52(1) is used to generate a data set corresponding to a second subsurface 52(2), and the downward-continuation process continues recursively until the maximum depth of interest is reached. As described in further detail below, the recursive downward continuation process preferably includes applying a Fast Fourier Transform (FFT) over offset to the data corresponding to each subsurface, applying a frequency-space downward continuation operator to the FFT-ed data, and applying an inverse FFT operator to the downward-continued data.

FIG. 2-D illustrates schematically the contribution of an exemplary common-azimuth source-receiver pair (S, R) at a depth D to a plurality of source-receiver pairs (S',R') situated at a depth $D'=D+\Delta z$. The trace corresponding to source receiver pair (S,R) contributes to a plurality of traces corresponding to a plurality of source-receiver pairs (S', R') below source receiver pair (S,R). All source-receiver pairs (S, R), (S',R') have a common azimuth (lie along parallel lines). As shown, the offsets of different source-receiver pairs (S',R') can be different from each other.

FIG. 2-E illustrates a similar contribution for an exemplary narrow-azimuth source-receiver arrangement. The offsets of source-receiver pairs (S',R') need not be strictly parallel to each other, but the source and receiver in a given pair (S', R') generally lie within a data acquisition width of each other. In a narrow-azimuth approach, the data along the initial surface is preferably arranged to common azimuth, but the data at higher depths can deviate from that azimuth.

In a step 26, the effects of offset aliasing are preferably reduced by applying an offset anti-aliasing operator to the input data set. Aliasing occurs when data is sampled more coarsely than the scale of the data variations. Aliasing can lead to undesired imaging artifacts that degrade the quality of the seismic image. FIGS. 3-A and 3-B show a comparison of two images migrated using common azimuth migration as described below, illustrating the imaging artifacts that may arise due to aliasing along the offset axis. FIG. 3-B shows a migrated image generated using input data well-sampled in offset, while FIG. 3-A shows a similar migrated image generated using input data with twice the offset sampling interval as in FIG. 3-A. The image of FIG. 3-A displays horizontal artifacts throughout the image, in many cases cutting through dipping geological events. FIGS. 4-A and 4-B show representative common depth point (CDP) gathers corresponding to the images of FIG. 3-A and 3-B, respectively. The offset spacing for the CDP gather of FIG. 4-A is a factor of four larger than the offset spacing for the CDP gather of FIG. 4-B. Offset aliasing is of particular significance for a downward continuation method as applied in the preferred embodiment of the present invention, since energy changes offsets during propagation. By contrast, in conventional Kirchhoff pre-stack depth migration (PSDM) methods, energy does not generally change offsets.

The anti-aliasing operator applied to the input data can be an interpolation operator that can refine the input data sampling. For example, an azimuth moveout method as described in the above-incorporated U.S. patent application Ser. No. 10/235,877 can be used to generate a finely-sampled input data set from a more coarsely-sampled input data set. The new offset spacing can be chosen so as to eliminate aliasing artifacts. Such an interpolation operator can require significant computational costs.

To reduce the effects of aliasing with less computational cost, the anti-alasing operator is preferably a filtering operator such as a bandpass or lowpass filter. Preferably, the filtering is performed selectively only where the slope (or moveout) of the events is largest, at far offset and shallow times. Such selective filtering allows maintaining high-frequency information in the data in regions where aliasing is of particular concern. Events at far offset and shallow times correspond to the upper part of the data in the lower-right of FIGS. 4-A–B. Events in a CDP gather slope according to the normal moveout equation $$t^2 = t_0^2 + \frac{x^2}{v^2} \qquad [1]$$

where t is the time at offset x, $t_0$ is the time at zero offset, and v is the rms velocity. Preferably, a bandpass filter is applied by evaluating the slope at all points in a CDP gather according to eq. [1], and locally applying to the data a triangle filter (smoother) with half-width equal to the slope. Other filters such as rectangular or Gaussian filters can also be applied. Applying a bandpass filter involves convolving the data along a trace at each point along the trace with a filtering waveform centered about that point.

FIGS. 5-A and 5-B illustrate the aliased CDP of FIG. 4-A before and after filtering as described above, respectively. High-frequency information is preserved where events have low slope, and filtered out where events slope out more steeply. FIG. 3-C shows an image corresponding to the images of FIGS. 3-A–B, generated by applying a triangle bandpass anti-aliasing filter as described above. FIG. 3-C displays much less artifact energy than FIG. 3-A, yet is overall nearly as high-frequency as FIG. 3-B despite the bandpass filtering of part of its input data.

More than one anti-aliasing operator can be applied to the input data. For example, an interpolation (resampling) operator can be applied in conjunction with a filtering operator. The finer the data are sampled in offset, the less filtering is needed to achieve a desired anti-aliasing effect, and vice-versa. Reducing the amount of filtering can be achieved by narrowing the filter half-width for a given CDP slope. If filtering is undesirable, for example because important information is contained in high-frequency energy at the far-offset portion of the earliest events, a resampling anti-aliasing operator can be used alone.

As shown in FIG. 1, a dependence of offset range with depth is preferably selected in a step 30. The dependence of offset range with depth is selected so as to reduce the offset range employed in the downward continuation process with depth. Reducing the offset range with depth allows improving the computational efficiency of the downward-continuation process. As data are downward continued, energy moves toward zero time and zero offset. At large depths, the farthest offsets cease contributing useful information to the image of the target volume. As the data are downward continued deeper, the offset at which the data cease to be useful moves closer to zero. Preferably, as the data are continued deeper, the number of offsets included in the downward continuation calculation is decreased without degrading the quality of the migrated image. The exact variation of the offset range with depth depends in general with the velocity model, which varies spatially. Preferably, the full offset range is used at the shallowest depth (the initial surface). A minimal offset range is then selected for the data at the deepest depth. The offset range at the intermediate depths can then be interpolated between the two extreme offset ranges by quasi-linear steps chosen to have low prime factors (e.g. lower than or equal to 5). The steps may also be chosen to lie generally along a non-linear, curved function.

Since the data are repeatedly Fourier transformed (FFTed) along the offset axis, reducing the offset range linearly may not improve the computational efficiency of the downward continuation method. Preferably, the number of offsets is reduced in steps, where each step corresponds to a number having a similarly-high number of factors of 2, 3, and possibly 5, and preferably no prime factors higher than five. For example, the number of steps is preferably reduced from 72 to 64, rather than from 72 to 71. Since 71 is a prime number, applying a Fourier transform for 71 offsets would be significantly more computationally-burdensome than applying a Fourier transform for 72 offsets. Preferably, the arrangement of the steps (the variation of offset number with depth) is made to lie approximately along a linear function extending between the numbers of offsets used at zero depth and at the maximum imaging depth. As noted below, the relevant number in the offset range for prime-factorization purposes is preferably the sum of the number of positive offsets in the range and the number of negative-offset reciprocal traces added in a step 36 described below.

In a step 32 shown in FIG. 1, the depth step size for each downward continuation step is selected according to the frequency of the input data and the velocity model. Preferably, the depth step size is chosen to be fine enough to avoid aliasing with depth, but coarse enough to avoid excessive computational effort. The total number of computations required to migrate a frequency slice scales with the number of depth steps taken. A depth step size that would barely avoid aliasing at 30 Hz would lead to a great deal of needless work at 5 Hz. Preferably, different frequencies are migrated independently, one at a time, and the step size is chosen separately for each frequency. If the downward continuation step size is also the depth sampling of the image, different step sizes are preferably reconciled before their contribution to the final migrated image is finalized. Reconciling different step sizes can include interpolating in depth the data corresponding to lower frequencies, which have larger depth samplings.

The preferred manner of performing the depth step size reconciliation can depend on the computing environment employed. On a distributed multiprocessor computer such as a Linux cluster, each node of the cluster may output its own version of the migrated image on its local disk. Such an approach minimizes network traffic, and allows the assignment of small contiguous blocks of frequencies to each cluster node for processing, with all frequencies in a block migrated with the same depth step size. In such an approach, the final image can be assembled by summing together all the partial images built from different frequency ranges. If different partial images have different depth step sizes, the coarser images can be resampled before summation. On a computer in which many migration processes share an image, the reconciliation is preferably done concurrently with the downward continuation processing. A dedicated process can be assigned to collect image slices from all the other migration processes, and add depth slices from coarsely sampled migrations to the finely sampled final image using sinc or Lagrange polynomial interpolation.

In a step illustrated at 34 in FIG. 1, the maximum processing depth is selected according to the frequency of the input data. High-frequencies at large depths tend to contribute only noise to the migrated image, since high frequencies do not propagate as far into the earth as lower ones. The downward continuation performed on each frequency slice is preferably stopped at a depth dependent on its frequency. Stopping the processing according to the frequency of the input data reduces the addition of high-frequency noise to the deep portions of the image and reduces the computational effort required to do so. Preferably, the software operator (user) is allowed to input a maximum frequency for the largest output depth. Frequencies below this maximum are migrated to the bottom of the image, while frequencies above this maximum are cut off at shallower depths. The variation of cutoff depth with frequency can be determined by interpolating (e.g. linearly) between two depths: a first depth selected as the maximum depth to which the highest frequency propagates, and a second depth selected as the maximum depth to which a predefined midrange frequency propagates. The lowest frequencies generally propagate throughout the entire depth of the volume of interest.

Reciprocal traces are preferably added to the input data in a step shown at 36 in FIG. 1, in order to reduce any edge-effect artifacts introduced by the downward-continuation step 38 into the image. As described below, the preferred downward-continuation step 38 is implemented as a convolution in midpoint and offset performed as a multiplication in midpoint and offset wavenumbers. Artifacts can arise where a convolutional operator reaches the ends of its input. In particular, when a convolution is performed as a convolution in the Fourier domain, the operator can produce wrap-around artifacts at the data edges. In general, the input data can be padded with a sufficient number of zeros to accommodate the length of the convolution operator.

Preferably, rather than add zeros at the zero-offset input data edge, reciprocal data are added for the convolution step. FIG. 6 illustrates an exemplary event curve 60 formed by events along a plurality of traces near zero offset, and a reciprocal event curve 62 formed by events along reciprocal traces added to the original input data. According to the principle of reciprocity, sources and receivers are interchangeable: a trace generated using a source positioned at a first locations and a receiver positioned at a second location is identical to a trace generated using a source at the second location and a receiver positioned at the first location. Consequently, data corresponding to negative offsets can be synthesized by reflecting a number of traces around zero offset. The number of negative-offset traces added is commonly between about 10 and about 20. The number of added negative offset traces is preferably chosen to be sufficiently high to eliminate edge effects, and at the same time to produce a sum easily factored into powers of 2, 3, and possibly 5, when added to the number of positive offsets in the offset range to be considered.

FIG. 3-D shows a migrated image generated using the same input data as the one for FIG. 3-B, but without reciprocal traces. Comparing FIGS. 3-B and 3-D illustrates that omitting reciprocal traces results in an image with less energetic and sometimes missing events, particularly where events have steep dips. Moreover, the top of the salt body in FIG. 3-D has an inaccurate shape.

The downward continuation step 38 shown in FIG. 1 is preferably performed as described above with reference to steps 26–36. The downward continuation step 38 is preferably applied for common-azimuth data. The full prestack common-azimuth downward continuation operator can be expressed in the frequency-wavenumber domain by the Double Square Root (DSR) dispersion relation:

$$k_z = \sqrt{\frac{\omega^2}{v_s^2} - \frac{1}{4}[(k_{mx} - k_{hx})^2 + (k_{my} - k_{hy})^2]} + \sqrt{\frac{\omega^2}{v_g^2} - \frac{1}{4}[(k_{mx} + k_{hx})^2 + (k_{my} + k_{hy})^2]} \quad [2]$$

where $\omega$ is the temporal frequency, $k_{mx}$ and $k_{my}$ are the midpoint wavenumbers, and $k_{hx}$ and $k_{hy}$ are the offset wavenumbers; $V_s$ and $v_g$ are the propagation velocities at the source and receiver location. By limiting the wavefield to have a common azimuth, the crossline direction component of the offset wavenumber $k_{hy}$ becomes zero, and the stationary phase solution for the integral in $dk_{hy}$ gives an expression for $k_{hy}$ function of the other variables $k_{mx}$, $k_{my}$, $k_{hx}$, $\omega$, $v_s$ and $v_g$:

$$\bar{k}_{hy}(z) = k_{my} \frac{\sqrt{\frac{1}{v_r^2} - \frac{1}{4\omega^2}(k_{mx} + k_{hx})^2} - \sqrt{\frac{1}{v_r^2} - \frac{1}{4\omega^2}(k_{mx} - k_{hx})^2}}{\sqrt{\frac{1}{v_s^2} - \frac{1}{4\omega^2}(k_{mx} + k_{hx})^2} + \sqrt{\frac{1}{v_s^2} - \frac{1}{4\omega^2}(k_{mx} - k_{hx})^2}}. \quad [3]$$

The expression of eq. [3] can be introduced into eq. [2] to downward continue and image the seismic wavefield. Following regularization by azimuth moveout as described above, the 4-D seismic wavefield becomes Data(t, $cmp_x$, $cmp_y$, h) where $cmp_x$ and $cmp_y$ are the common-midpoint coordinates, h represents the offset, and t represents the time axis. For further information on Eqs. [3] and [4] see the article by Biondi et al., "3-D Prestack Migration of Common-Azimuth Data," *Geophysics* 61(6): 1822–1832 (1996).

The downward-continuation step 38 can also be applied for narrow-azimuth data. The narrow-azimuth downward-continuation operator is preferably:

$$D_{z+\Delta z}(\omega,k_m,k_{hx},h_y)=D_z(\omega,k_m,k_{hx},h_y)\times \text{Down}(\omega,k_m,k_{hx},h_y) \quad [4a]$$

where $$\text{Down}(\omega, k_m, k_{hx}, h_y) = \sqrt{\frac{2\pi}{\varphi''(\hat{k}_{hy})}}\, e^{-i\phi(\hat{k}_{hy})+i\frac{\pi}{4}}, \quad [4b]$$

$$\varphi = DSR(\omega, k_m, k_h, z)dz + k_{hy}h_y. \quad [4c]$$

For further information on eqs. [4a–c] see the article by Vaillant et al., "Extending Common-Azimuth Migration," *Stanford Exploration Project Report* 100:125–135 (1999).

The data generated by the recursive downward continuation process is preferably employed to build a final image of the volume of interest, as illustrated by the step 40 in FIG. 1. As described above, building the final image can include summing data corresponding to different frequencies generated by different, independent processes assigned to independent processors. The final image amplitude at each depth and location can be chosen to be essentially the zero-time, zero-offset downward-continued amplitude at that depth and location. The extraction of the image from the downward-continued data may also include data at non-zero times or offsets.

The systems and methods described above are suitable for use not only as a 3-D prestack imaging tools, but but also to image 2-D postack and prestack data, as well as 3-D poststack data. In the absence of a crossline term and an offset term, equation [2] becomes a 2-D zero-offset downward continuation operator. In the absence of the 3-D crossline term, but keeping the inline offset term, the operator becomes a 2-D prestack downward continuation operator. Keeping the 3-D crossline term, but without the offset term, the operator becomes a 3-D poststack operator.

The present invention further provides computers and computer systems programmed to perform the methods described herein, computer-readable media encoding instructions to perform the methods described herein, and computer apparatus comprising means for performing the method steps described herein. Suitable means for performing the method steps described herein include computer hardware programmed with corresponding software.

It will be clear to one skilled in the art that the above embodiments may be altered in many ways without departing from the scope of the invention. Accordingly, the scope of the invention should be determined by the following claims and their legal equivalents.

What is claimed is:

1. A computer-implemented common azimuth wave-equation migration seismic data processing method comprising:
   providing a common-azimuth input data set for a geophysical data processing volume of interest;
   providing a velocity model for the geophysical data processing volume;
   applying an offset antialiasing operator to the input data set; and
   performing a recursive wave-equation downward-continuation of the common-azimuth input data set to a plurality of successive common-azimuth surfaces.

2. The method of claim 1, wherein applying the offset antialiasing operator comprises applying a lowpass filter to the input data set.

3. The method of claim 1, wherein applying the offset antialiasing operator comprises applying a bandpass filter to the input data set.

4. The method of claim 3, wherein the bandpass filter has a spatially-varying filtering halfwidth proportional to a moveout at a location of application of the bandpass filter.

5. The method of claim 3 wherein the bandpass filter has a spatially-varying filtering halfwidth substantially equal to a slope on a common depth point gather at a location of application of the bandpass filter.

6. The method of claim 3, wherein the bandpass filter is a triangle filter.

7. The method of claim 1, further comprising adding a plurality of reciprocal traces to the input data set around zero offset.

8. The method of claim 7, wherein adding the plurality of reciprocal traces comprises selecting a number of reciprocal traces such that a sum of a total number of reciprocal and non-reciprocal traces to be used in the recursive downward continuation does not have any prime factors higher than 5.

9. The method of claim 1, further comprising selecting a depth-dependence of an offset range employed in the recursive downward continuation.

10. The method of claim 9, wherein selecting the depth dependence of the offset range employed in the recursive downward continuation comprises selecting a minimum offset range corresponding to a maximum depth of the volume of interest.

11. The method of claim 1, further comprising selecting a frequency dependence of a depth step size employed in the recursive downward continuation.

12. The method of claim 11, wherein the frequency dependence is selected so at so avoid aliasing in depth.

13. The method of claim 1, further comprising selecting a frequency dependence of a cutoff depth employed in the recursive downward continuation.

14. The method of claim 13, wherein selecting the frequency dependence of the maximum depth comprises:
   selecting a maximum frequency for a maximum depth;
   selecting a highest-frequency cutoff depth for a highest frequency; and
   determining a plurality of cutoff depths for a corresponding plurality of frequencies by performing a frequency interpolation between the highest-frequency cutoff depth and the maximum depth.

15. The method of claim 14, wherein the frequency interpolation is substantially a linear interpolation.

16. The method of claim 1, wherein providing the common-azimuth input data set comprises applying azimuth moveout to an input data set having a plurality of azimuths to generate the common-azimuth input data set.

17. The method of claim 1, wherein providing the velocity model comprises performing migration velocity analysis on an initial velocity model.

18. The method of claim 17, wherein performing migration velocity analysis on the initial velocity model comprises determining a plurality of residual velocity values from a corresponding plurality of angle-domain common image gathers, and updating the initial velocity model according to the plurality of residual velocity values.

19. The method of claim 1, further comprising partitioning the recursive downward continuation according to data frequency among a plurality of processes, and assigning each of the plurality of processes to an independent processor of a multi-processor cluster.

20. The method of claim 1, wherein each of the plurality of processes generates a partial frequency-dependent image, and wherein generating the image of the volume of interest comprises summing a plurality of partial frequency-dependent images.

21. The method of claim 1, further comprising employing downward-continued data along the plurality of successive common-azimuth surfaces to generate an image of the volume of interest by migration.

22. The method of claim 1, further comprising extracting an image of the volume of interest from the downward-continued data along the plurality of successive common-azimuth surfaces.

23. A computer programmed to perform a seismic data processing method comprising:
   providing a common-azimuth input data set for a geophysical data processing volume of interest;
   providing a velocity model for the geophysical data processing volume;
   applying an offset antialiasing operator to the input data set; and
   performing a recursive wave-equation downward-continuation of the common-azimuth input data set to a plurality of successive common-azimuth surfaces.

24. A computer-readable medium encoding instructions to perform a seismic data processing method comprising:
   providing a common-azimuth input data set for a geophysical data processing volume of interest;
   providing a velocity model for the geophysical data processing volume;
   applying an offset antialiasing operator to the input data set; and
   performing a recursive wave-equation downward-continuation of the common-azimuth input data set to a plurality of successive common-azimuth surfaces.

25. A seismic data processing apparatus comprising:
   means for providing a common-azimuth input data set for a geophysical data processing volume of interest;
   means for providing a velocity model for the geophysical data processing volume;
   means for applying an offset antialiasing operator to the input data set; and
   means for performing a recursive wave-equation downward-continuation of the common-azimuth input data set to a plurality of successive common-azimuth surfaces.

26. A computer-implemented common azimuth wave-equation seismic data processing method comprising:
   providing a common-azimuth input data set for a geophysical data processing volume of interest;
   providing a velocity model for the geophysical data processing volume;
   applying an offset antialiasing operator to the input data set; and
   performing a recursive wave-equation downward-continuation of the common-azimuth input data set to a plurality of successive common-azimuth surfaces, wherein performing the recursive downward continuation comprises:
     adding a plurality of reciprocal traces to the data at each common-azimuth surface around zero offset;
     selecting a depth-dependence of an offset range employed in the recursive downward continuation;
     selecting a frequency dependence of a depth step size employed in the recursive downward continuation; and
     selecting a frequency dependence of a cutoff depth employed in the recursive downward continuation.

27. A computer-implemented common azimuth wave-equation seismic data processing method comprising:
   providing a common-azimuth input data set for a geophysical data processing volume of interest;
   providing a velocity model for the geophysical data processing volume; and
   performing a recursive wave-equation downward-continuation of the common-azimuth input data set to a plurality of successive common-azimuth surfaces, wherein performing the recursive downward continuation comprises selecting a frequency dependence of a depth step size employed in the recursive downward continuation.

28. A computer-implemented narrow azimuth wave-equation seismic data processing method comprising:
   providing an input data set for a geophysical data processing volume of interest;
   providing a velocity model for the geophysical data processing volume;
   applying an offset antialiasing operator to the input data set; and
   performing a recursive wave-equation downward-continuation of the input data set to a plurality of successive narrow azimuth surfaces.

29. A computer programmed to perform a seismic data processing method comprising:
   providing an input data set for a geophysical data processing volume of interest;
   providing a velocity model for the geophysical data processing volume;
   applying an offset antialiasing operator to the input data set; and
   performing a recursive wave-equation downward-continuation of the input data set to a plurality of successive narrow azimuth surfaces.

30. A computer-readable medium encoding instructions to perform a seismic data processing method comprising:
   providing an input data set for a geophysical data processing volume of interest;
   providing a velocity model for the geophysical data processing volume;
   applying an offset antialiasing operator to the input data set; and
   performing a recursive wave-equation downward-continuation of the input data set to a plurality of successive narrow azimuth surfaces.

31. A seismic data processing apparatus comprising:
   means for providing an input data set for a geophysical data processing volume of interest;
   means for providing a velocity model for the geophysical data processing volume;
   means for applying an offset antialiasing operator to the input data set; and
   means for performing a recursive wave-equation downward-continuation of the input data set to a plurality of successive narrow azimuth surfaces.

32. A computer-implemented narrow azimuth wave-equation migration seismic data processing method comprising:
   providing an input data set for a geophysical data processing volume of interest;

providing a velocity model for the geophysical data processing volume; and performing a recursive wave-equation downward-continuation of the input data set to a plurality of successive narrow azimuth surfaces, wherein performing the recursive downward continuation comprises selecting a frequency dependence of a depth step size employed in the recursive downward continuation.

* * * * *